(12) United States Patent
Gobbak et al.

(10) Patent No.: US 6,964,530 B2
(45) Date of Patent: Nov. 15, 2005

(54) SELF-CORRECTING PRINTING SYSTEM

(75) Inventors: Nataraj Kumar Gobbak, Boise, ID (US); Jeetendra Kumar, Boise, ID (US); Roman Thomas Wachter, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/764,017

(22) Filed: Jan. 23, 2004

(65) Prior Publication Data

US 2005/0163550 A1 Jul. 28, 2005

(51) Int. Cl.$^7$ .............................. B41J 11/44; B41J 3/42
(52) U.S. Cl. ......................................... 400/76; 400/74
(58) Field of Search .................... 400/76, 74; 709/223; 700/223; 358/1.14; 355/77; 399/19

(56) References Cited

U.S. PATENT DOCUMENTS

| | | | | |
|---|---|---|---|---|
| 3,813,157 | A | * 5/1974 | Fantozzi | 399/79 |
| 3,819,266 | A | * 6/1974 | Price | 355/64 |
| 4,054,380 | A | * 10/1977 | Donohue et al. | 700/27 |
| 4,163,897 | A | * 8/1979 | Hubbard et al. | 377/8 |
| 4,229,100 | A | * 10/1980 | Travis | 355/77 |
| 5,179,410 | A | * 1/1993 | Farrell et al. | 399/9 |
| 5,365,349 | A | * 11/1994 | Knodt et al. | 358/406 |
| 5,580,046 | A | * 12/1996 | Beaufort et al. | 271/3.16 |
| 5,696,690 | A | * 12/1997 | Richardson et al. | 700/219 |
| 5,748,483 | A | * 5/1998 | Richardson et al. | 700/223 |
| 5,982,995 | A | * 11/1999 | Covert et al. | 358/1.15 |
| 6,661,978 | B2 | * 12/2003 | Brewington | 399/19 |
| 6,671,835 | B1 | * 12/2003 | Hanna et al. | 714/712 |
| 6,678,863 | B1 | * 1/2004 | Sugiyama | 714/799 |
| 2002/0060703 | A1 | * 5/2002 | Tsukada | 347/5 |
| 2003/0095279 | A1 | * 5/2003 | Kim | 358/1.14 |
| 2003/0131307 | A1 | * 7/2003 | Taylor et al. | 714/763 |
| 2003/0184798 | A1 | * 10/2003 | Enomoto et al. | 358/1.15 |
| 2004/0034698 | A1 | * 2/2004 | Abu-Husein et al. | 709/223 |

OTHER PUBLICATIONS

Microsoft Press Computer Dictionary, 1997, Third Edition, pp. 312-313.*

"Principles of Fault Tolerance", Robert V. White et al., IEEE, 1996, pp. 18-25.

"NASA Software Fault Tolerance: A Tutorial", Wilfredo Torres-Pomales, National Aeronautics and Space Administration, Oct. 2000.

* cited by examiner

Primary Examiner—Daniel J. Colilla
Assistant Examiner—Wasseem H. Hamdan

(57) ABSTRACT

A system and method are provided for correcting a hang condition caused by an unanticipated exception during a printing process. The method may include providing a set of predetermined rules according to which the print process modules interact to control the printing process. The method further may include monitoring, from a self-correcting module, a state of each of a plurality of the print process modules. The method may also include determining that the printing device is hung during a printing process, based on at least one predetermined rule and the state of at least one print process module, and setting the state of at least one print process module to a default condition.

10 Claims, 9 Drawing Sheets

Communication flow for a scenario where the paper path module is hung becaus print engine goes to a not-ready state after a start print has been issued

Communication flow for a scenario where the printing device is hung because of a race condition in the paper path modul during a job cancel request

Print Controller States Relating to Page Notification and Cancellation

SELF-CORRECTING PRINTING SYSTEM

BACKGROUND

A set of programmed instructions may be used to control a printing process in a printing device. The instruction set may be installed within the printing device itself, or may be stored on a networked computing device that communicates with the printing device through a communications network. When stored on the printing device, the instruction set is typically stored as firmware, that is, software that is written into in read-only memory of the printing device, such as ROMs, PROMs, EPROMs.

In the printing device firmware, there may be several programming modules that work cooperatively, with each firmware module performing specific functions or tasks during a print job. For example, in the case of a laser printer, one or more firmware modules and sub-modules may receive data from an associated processor, translate and/or parse the data, choose a print medium, control movement of the medium through a paper path, control the transfer of ink onto the medium, and/or prepare the printer for a subsequent print job. The rules governing interactions between firmware modules are sometimes referred to as a "design contract" between the modules.

Various circumstances may occur during a printing process that result in an "exception", or an error condition. Some exceptions may commonly arise during normal operation of a printing device, and a firmware programmer may anticipate these. For example, the programmer may include instructions in the firmware so that a "paper out" condition causes the printing process to pause, and causes a signal to be generated on a control panel of the printing device to alert a user that more paper is required. Similarly, conditions such as low toner, paper jam, and the like, among others, are exceptions that typically are anticipated during firmware development. Such exceptions may require human intervention before completion of the printing process, but typically do not lead to a global failure of the print job.

During development of the printing device firmware modules, a programmer may attempt to simulate a wide variety of printing conditions, including various exception conditions, and to include programming elements in the firmware to react to each of these exception conditions without a global failure of the print job. However, it may not be possible to predict every possible printing condition that could lead to an exception. Therefore, unusual or atypical printing conditions may occasionally arise that result in an unanticipated exception. In this case, design contract rules may not be in place to govern the interaction between firmware modules, and/or existing design contract rules may be violated. For instance, a firmware module may receive an unexpected communication from another module, or may fail to receive an expected communication.

Other unanticipated exceptions may occur during a printing process as a result of undetected programming errors (commonly known as "bugs") in the printing device firmware. A programmer may employ various debugging tools to help uncover and correct such errors, and thereby to avoid possible related exceptions within the firmware. However, it may not be possible to uncover every programming error during development, so that the firmware may still occasionally experience bug-related exceptions even after development of the firmware is substantially complete.

Unanticipated exceptions, including those related to unanticipated printing conditions and/or those related to undetected programming errors, may result in global failure of a printing process, so that the print job being processed at the time of the exception cannot be completed. When this occurs, the firmware typically "hangs", requiring a user to cycle the printing device power in order to reset all of the firmware modules to an initial default state. Cycling the power in this manner typically causes the printing device firmware to recover from the exception, but typically also requires the user to resend the print job to the printing device. This causes delays in printing, and can result in added expense and inconvenience for the printing device user.

DETAILED DESCRIPTION

Figure 1:
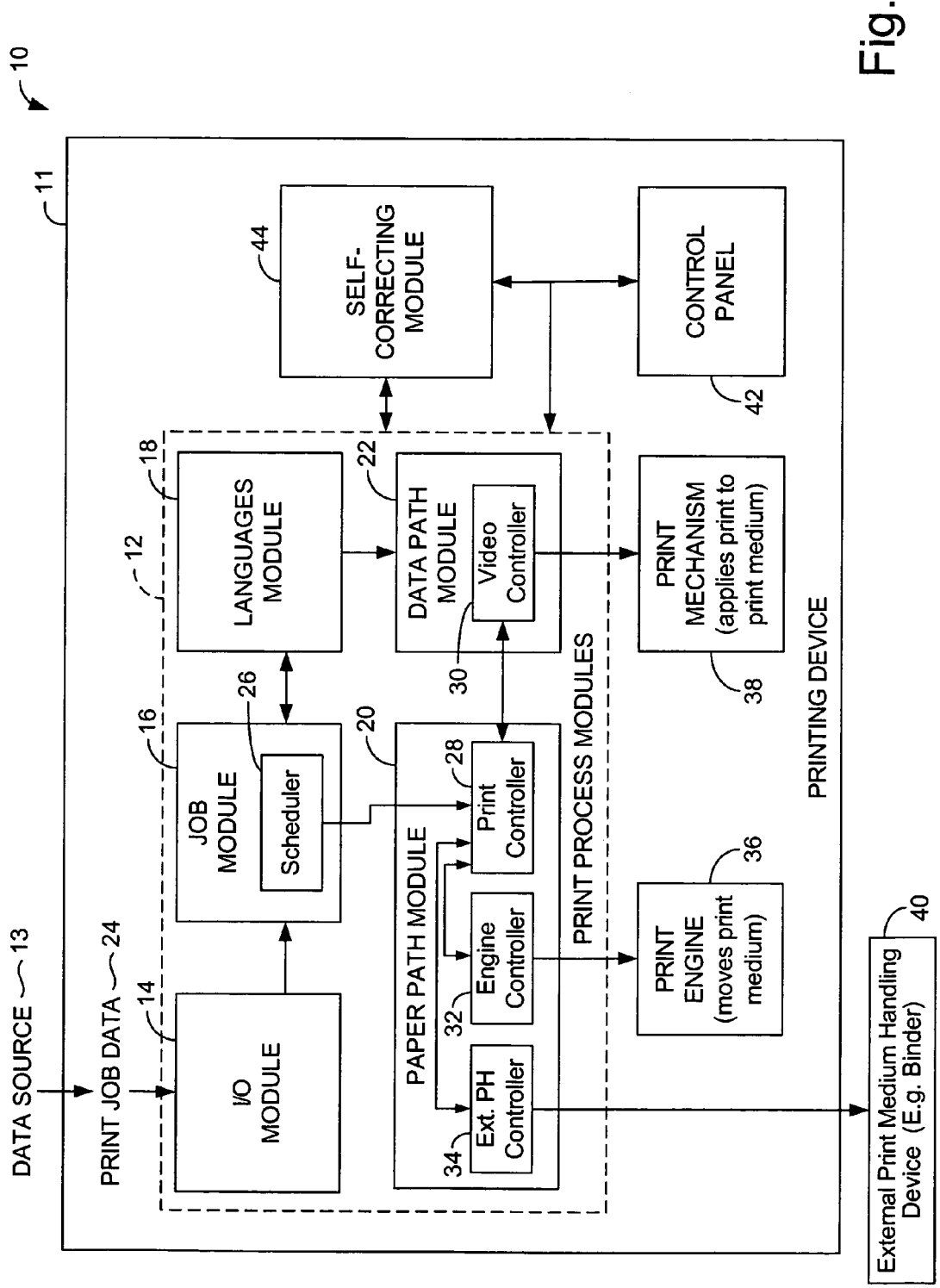
FIG. 1 is a schematic view of a printing device according to one embodiment of the present invention.

FIG. 1 shows a self-correcting printing system 10 according to one embodiment of the present invention. System 10 typically includes a printing device 11, such as a laser printing device, having a plurality of print process modules 12, each of which fulfills one or more functions during a print job. Print process modules 12 typically include an input/output (I/O) module 14, a job module 16, a paper path module 20, a languages module 18, and a data path module 22. The print process modules are typically stored as firmware in the printing device, that is, as software that is written into in read-only memory, such as ROMs, PROMs, EPROMs, of the printing device. These and other modules may be designed to function and interact in a wide variety of ways during processing of a print job. A self-correcting module 44 is provided to communicate with print process modules 12 and assist in detecting and recovering from hang conditions in the printing device.

I/O module 14 typically is responsible for receiving print job data 24 arriving at printing device 11. The I/O module is typically configured to receive the print job data from a data source 13 such as a computing device, digital camera, etc. The I/O module generally is configured to receive data transmitted according to various protocols, such as parallel I/O, network I/O, USB-1394, infra-red wireless and other wireless protocols such as Bluetooth. The I/O module typically presents the print job data to another module, such as the job module, for further processing as described below.

Job module 16 typically is responsible for creating and managing discrete print jobs within the printing system. These may include both currently active print jobs, and also stored jobs that may become active at some future time. More specifically, the job module may perform several functions, including among others:

connecting to the I/O module to receive print data corresponding to one or multiple print jobs;
separating data into coherent units corresponding to individual jobs;
providing data to the languages module (see below) for processing;
providing the status of jobs in the system to various other modules and/or to a control panel;
scheduling jobs and defining job/copy boundaries;
providing a mechanism to schedule simplex/duplex pages for optimal printing; and/or
synchronizing delivery of print data with arrival of print medium pages at a printing destination.

Job module 16 typically includes a sub-module referred to as a scheduler 26. Scheduler 26 is configured to send pages of print job data 24 to a print controller sub-module 28 in paper path module 20, discussed below, once page characteristics (such as requested size, type, etc.) for a page of the print job are defined.

Languages module 18 typically is configured to interpret and parse print data that has been received, e.g., from job module 16, and may send the parsed data to another module such as the data path module. Languages module 18 may be configured to interpret various page description languages such as Printer Control Language (PCL), PCL-XL, PostScript, and the like.

Data path module 22 typically may receive print data from another module, such as languages module 18, and may use the received data to define imaging characteristics of the print job. The data path module may use graphics and image processing algorithms to process each page, and to render video data for imaging on the paper or other print medium. The data path module typically includes a video controller 30 configured to send a video-ready signal (indicating that video data for a page is ready to be sent to the print mechanism 38) to the print controller in paper path module. Video controller 30 also is configured to interface with video hardware for data transfer to print mechanism 38. Print mechanism 38 is typically a laser print mechanism, but may alternatively be an ink jet mechanism or any other suitable mechanism for applying print to a print medium.

More specifically, data path module 22 may have the following responsibilities, among others:

providing various imaging control features necessary to define a page, such as fonts, graphics, and the like;
providing support for imaging operations such as rotation, scaling, color tables, and the like;
decomposing imaging operations into simpler marking primitives to facilitate the building of a display list and subsequent graphical rendering of print data;
providing building and rendering components for an intermediate print data storage mechanism to optimize print data time and space requirements;
compressing and/or decompressing video data as needed; and/or
providing an interface from the firmware to the video hardware.

Paper path module 20 typically is responsible for controlling the movement of a print medium, such as paper, through printing device 11, storing information about print hardware capabilities, determining a paper source (e.g. a paper tray or manual feed) and a paper destination tray, posting messages to control panel 42 when user intervention is required, and/or maintaining optimal performance of the paper path. Paper path module 20 typically includes a print controller sub-module 28, an engine controller sub-module 32, and external print medium handler controller sub-module 34, also referred to as an external PH handler controller 34. Print controller 28 is typically configured to receive a page from scheduler 26, and is also configured to receive video-ready data for the page from video controller 30. Print controller 28 coordinates the starting of printing with video controller 30, with respect to data transfer, and with engine controller 32, with respect to paper movement. The engine controller is configured to interface with print engine 36 to control paper movement through the engine. External PH Controller 34 is configured to interface with the external print medium handling device 40, as referred to as a external PH device (e.g., a sorter, binder, laminating device, etc.), to control the paper movement through the external PH device.

More specifically, responsibilities of the paper path module 20 may include, among others:

selecting a logical source and destination for a page;
controlling print medium movement in the print engine 36 hardware;
reporting hardware related errors such as jams, paper outs, bin full, etc. to the user, via the control panel 42 and/or data source device 13;
handling any error/exception in the printing system due to hardware faults (e.g., paper jams, paper outs, etc.) or user events (such as job cancel, offline overrides, etc.);
providing an error recovery mechanism in the system;
calibrating color engines based on engine need or user configuration;
monitoring state information for print engine and PH devices; and/or
providing an interface to the print engine hardware and any external PH devices.

In order to perform their designated functions in a coordinated manner, each firmware module within printing device 11, including those described above, typically interacts with other modules based on a set of programmed interaction rules. These interaction rules, which may be referred to as design contract rules, govern the responses of each module to communications from the other modules. Such responses may include, for example, signals transmitted from the firmware to one or more hardware components of the printing device, as well as communications sent from a firmware module to one or more other firmware modules. An explanation of successful printing according to the design contract rules is illustrated in FIG. 2, and an explanation of failure of printing, i.e., a hang condition, and subsequent self-correction is explained with reference to the remaining figures.

EXAMPLE 1

Successful Print Job

Figure 2:
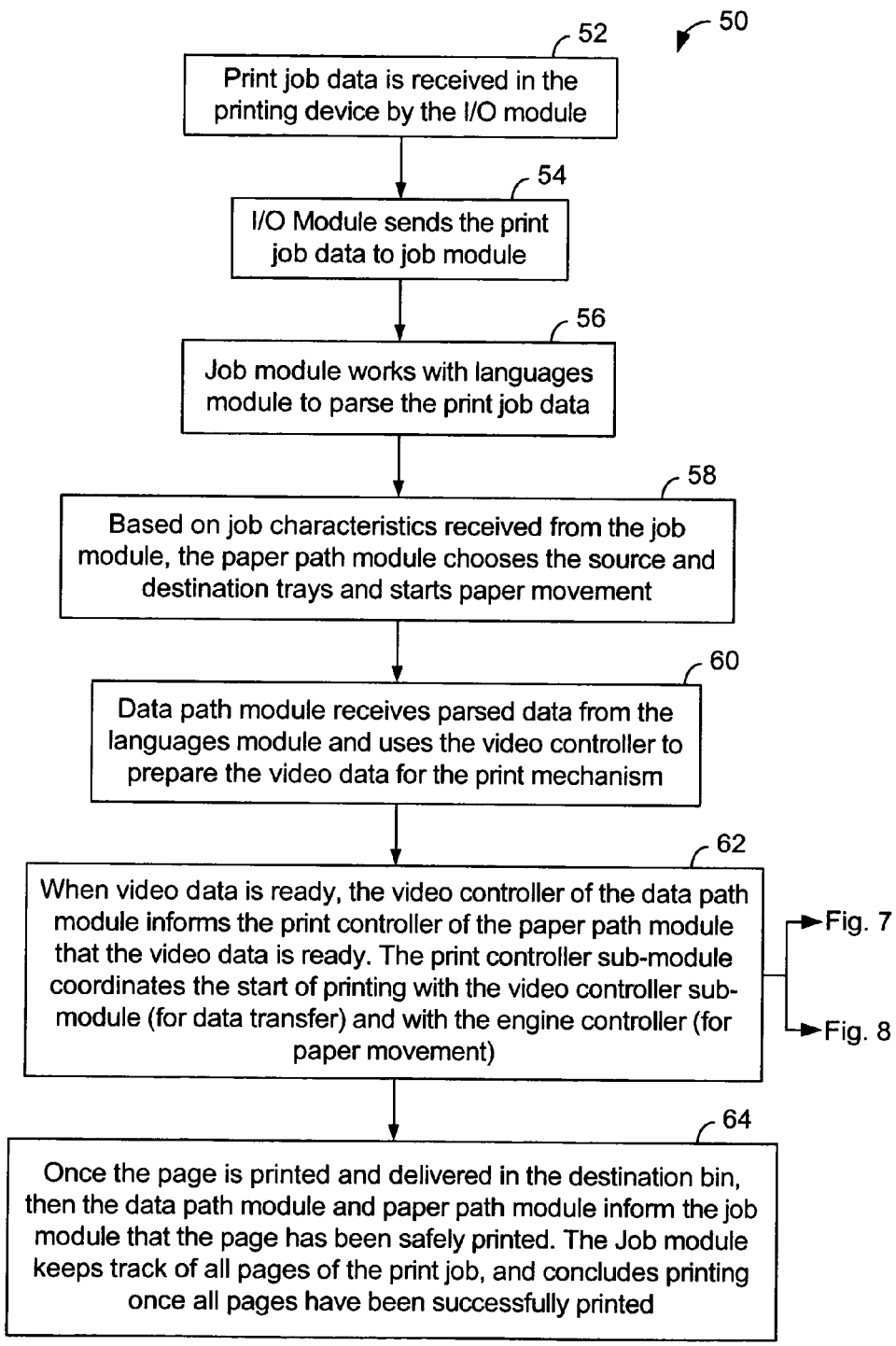
FIG. 2 is a flowchart showing a communication flow during a successful print job processed by the printing device of FIG. 1.

FIG. 2 is a flow diagram illustrating a method 50 performed by the above described components during a successful print job. At 52, print job data 24 is received in the printing device 11 by the I/O module 14. At 54, the I/O module sends the print job data 24 to job module 16, and at 56 the job module works with languages module 18 to parse the print job data. As shown at 58, based on job characteristics received from the job module, paper path module 20 chooses the source and destination trays for the print job, and starts paper movement in the print engine.

At 60, the data path module 22 receives the parsed data from the languages module and uses video controller 30 to prepare the data for the print mechanism 38. As shown at 62, when video data is ready, video controller 30 of data path module 22 informs print controller 28 of paper path module 20 that the video data is ready. Print controller 28 next coordinates the start of printing with the video controller, for data transfer, and with the engine controller, for paper movement. As shown at 64, once the page is printed and delivered in the destination bin, then the data path module and paper path module inform the job module that the page has been safely printed. The job module keeps track of all pages of the print job, and concludes printing once all pages have been successfully printed.

As described above, various unanticipated exceptions, such as race conditions, corner conditions, design contract violations, and miscommunication caused by programming bugs, may result in a printing process that is unable to be completed because the printing device is "hung." As used herein a printing device is "hung" when it fails to process a print job and return control to a user. Thus, a printing device that stops a print job because of a known exception during the printing process, such as an out-of-paper condition, and properly returns control to the user, e.g. with a request to add additional paper, is not hung. As used herein, the term "race condition" refers to an undesirable condition that may occur in a printing device, according to which the device attempts to perform two or more operations at the same time, but because of the nature of the design contract under which the printing device operates, the operations cannot be completed because they must be done in the proper sequence in order to be performed correctly. The term "corner condition" refers to a condition where program logic of the instruction set controlling the printing device becomes stranded and appears to stop functioning. These and other unanticipated exceptions, bugs and design contract violations cause the printing device to hang and appear "frozen" to the user, such that the printing device may not be used without cycling power to the printing device.

Figure 3:
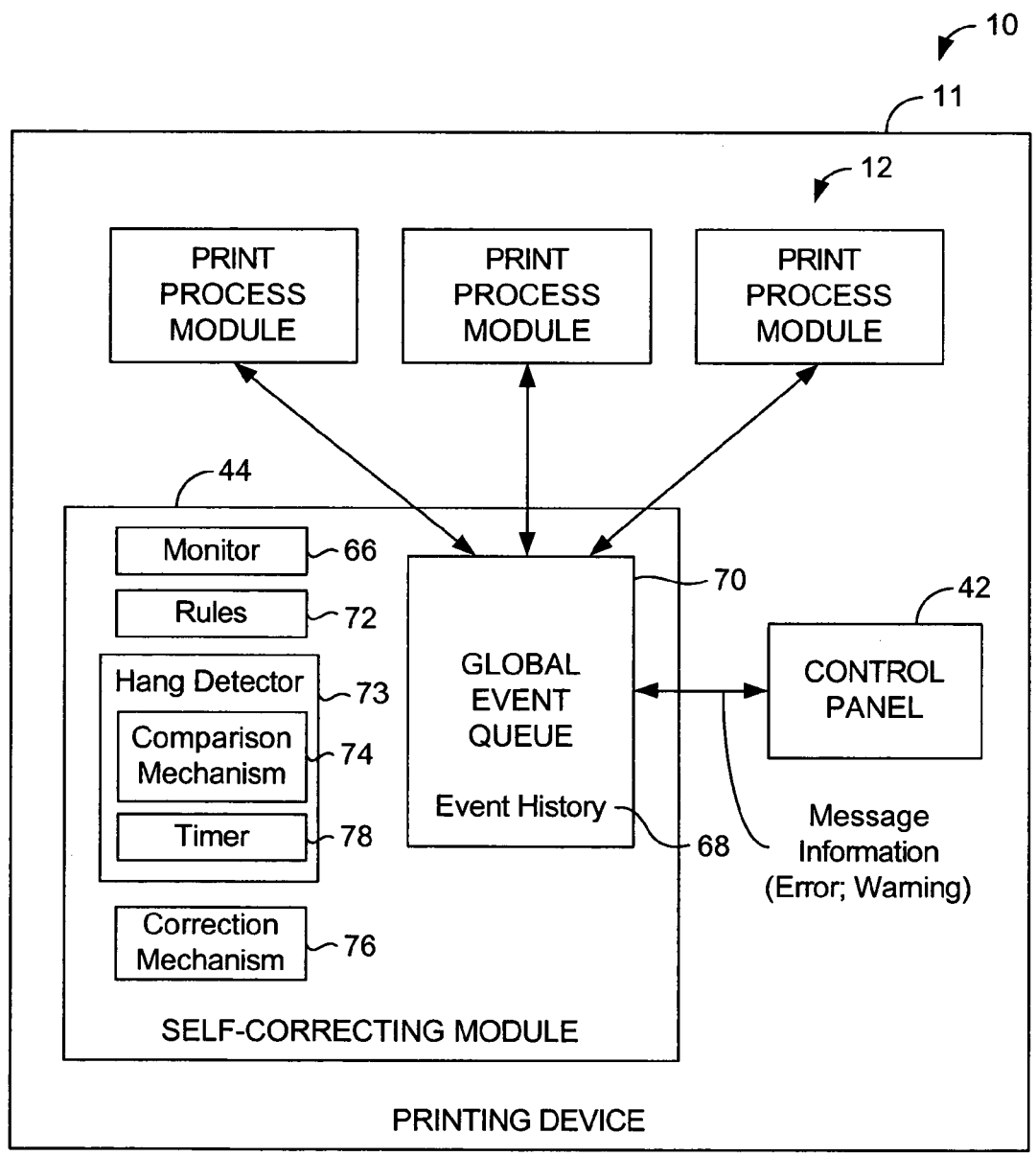
FIG. 3 is a schematic view of the printing device of FIG. 1, showing internal features of a self-correcting module.

In order to detect and recover from such a hang condition, the instruction set of printing device 11 further typically includes a self-correcting module 44 configured to interact with each of print process modules 12. As shown in FIG. 3, the self-correcting module typically includes a module status monitor 66 configured to monitor a current state of at least a plurality of print process modules of the instruction set. The self-correcting module further includes a global event queue 70 including an event history 68 configured to store information relating to states of each of the print process modules. The module status monitor 66 is configured to monitor the states of each of the print process modules over time by receiving status messages (i.e., event messages) from each of the print process modules, and storing the status messages in the event history.

The self-correcting module further includes a plurality of event rules 72 that describe the manner in which the plurality of print modules interact. The event rules 72 may be identical to the design contract rules discussed above, and/or may include additional rules that are specifically programmed using expert systems or other technologies, to enable the self-correcting module to quickly identify hang conditions. The self-correcting module may further include a hang detector 73 configured to determine that the printing device is hung during a printing process, based on one or more of predetermined rules 72 and a state of one or more print process module stored in the event history 68.

The hang detector may include a comparison mechanism 74 configured to determine an expected state of each print process module based on the event history 68 and event rules 72, and to detect a discrepancy between the expected state and the current state of one or more of the print process modules. The hang detector may further include a timer 78 configured to measure a period of time over which the conditions of one or more event rules 72 are satisfied.

Self-correcting module 44 may further include a correction mechanism 76 configured to change the current state of one or more of the print process modules to a respective default state, such that the modules are in sync and may again communicate with each other properly. This may be accomplished in a variety of ways, including by sending an assert command to each of the print process modules, to cause each print process module to assume as true the asserted condition, which is typically a default condition. Correction mechanism 76 may be configured to change the current state of the print process modules only after verifying, utilizing timer 78, that the conditions for an event rule 72 have been satisfied for a predetermined period of time.

The self-correcting module 44 is typically implemented in firmware of the printing device, although it will be appreciated that it may alternatively be wholly or partially implemented in software or hardware of the printing device. For example, the self-correcting module may be stored as firmware in read-only memory of the printing device, a software program module stored on a hard disk of the printing device, or implemented in hardware such as an Application Specific Integrated Circuit (ASIC) of the printing device. Alternatively, as described below, the self-correcting module 44 may be partially or wholly stored apart from the printing device.

Figure 4:
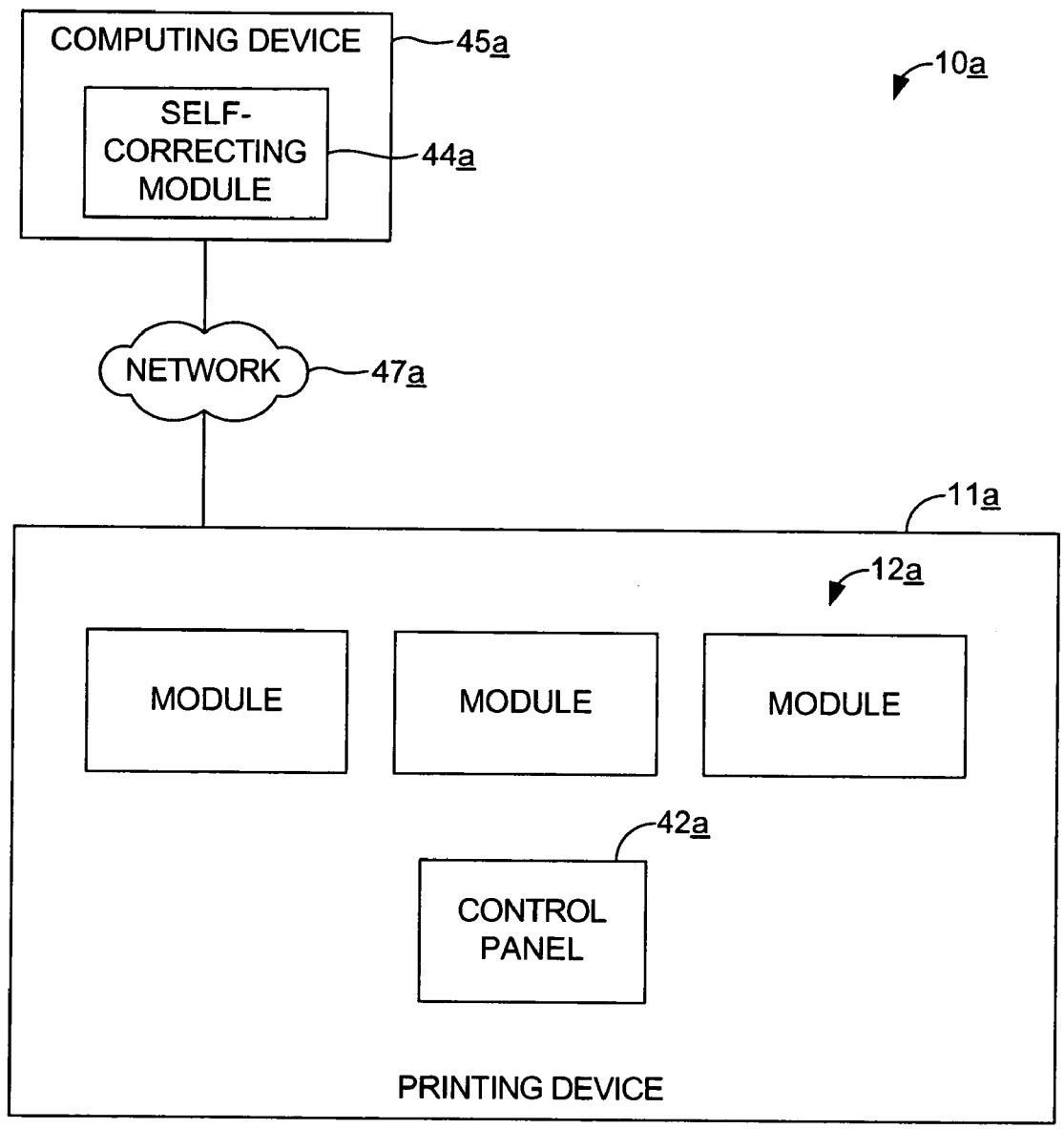
FIG. 4 is a schematic view of a printing device according to another embodiment of the present invention.

As shown in FIG. 4, it will be appreciated that according to another embodiment of the present invention, system 10a may include a printing device 11a with a plurality of modules 12a similar to modules 12 described above, and a self-correcting module 44a that is provided wholly or partially on a remote computing device 45a accessible from the printing device via a computer network 47a. According to this embodiment each of the modules 12a and control panel 42a is configured to communicate with self-correcting module 44a by sending status messages to the self-correcting module via the network.

Figure 5:
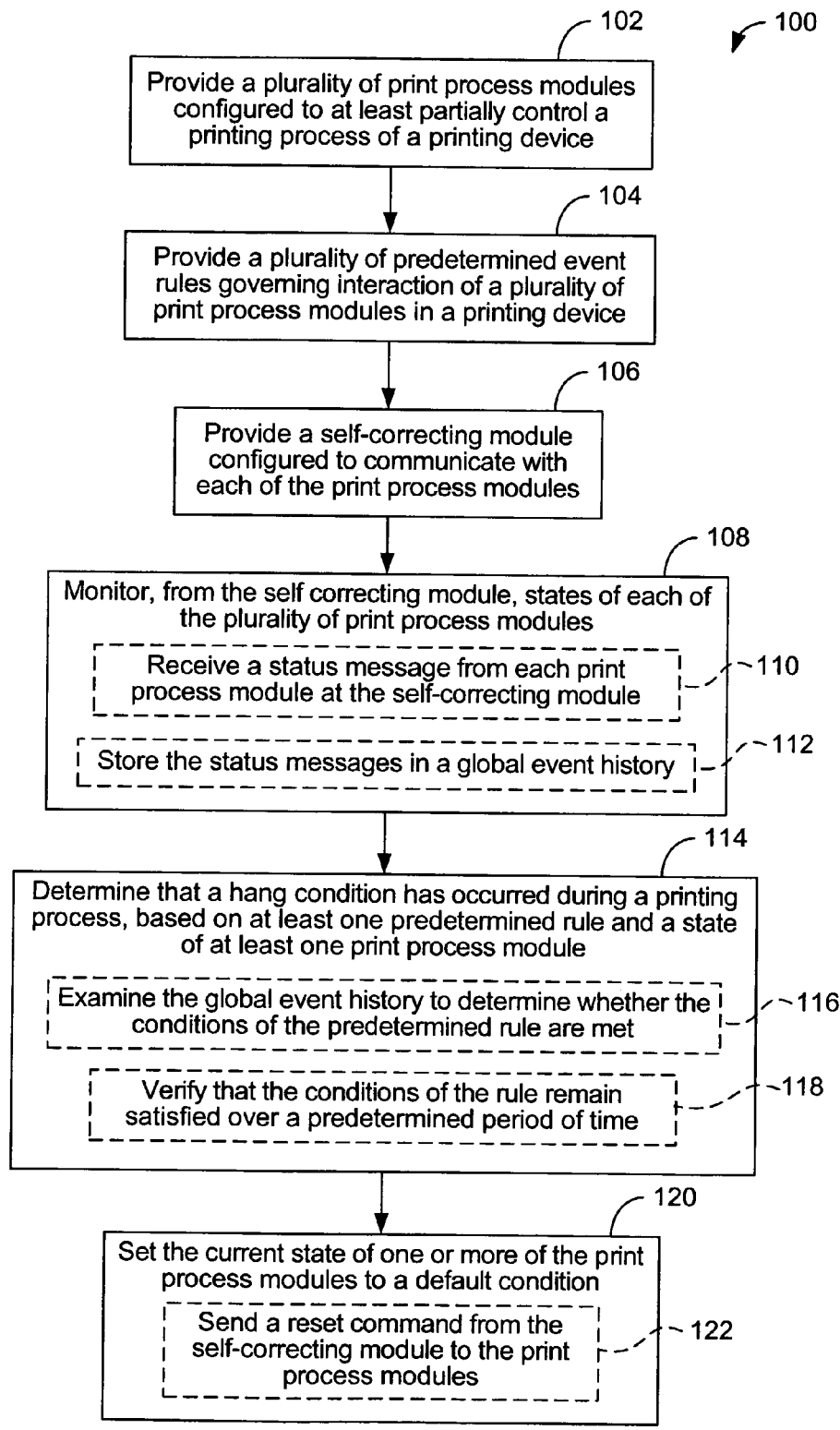
FIG. 5 is a flowchart showing a method for correcting a hang condition caused by an unanticipated exception during a printing process, according to one embodiment of the present invention.

FIG. 5 shows a method 100 for correcting an exception during a printing process, according to one embodiment of the present invention. Method 100 typically includes, at 102, providing a plurality of print process modules configured to at least partially control a printing process of a printing device. At 104, the method typically includes providing a plurality of predetermined event rules governing interaction of the plurality of print process modules. At 106, the method typically includes providing a self-correcting module configured to communicate with each of the print process modules.

At 108, the method further includes monitoring, from the self-correcting module, a current state of each of the plurality of print process modules. As shown at 110, 112, monitoring may include receiving a status message from each print process module at the self-correcting module, and storing the status messages in a global event history.

Figure 6:
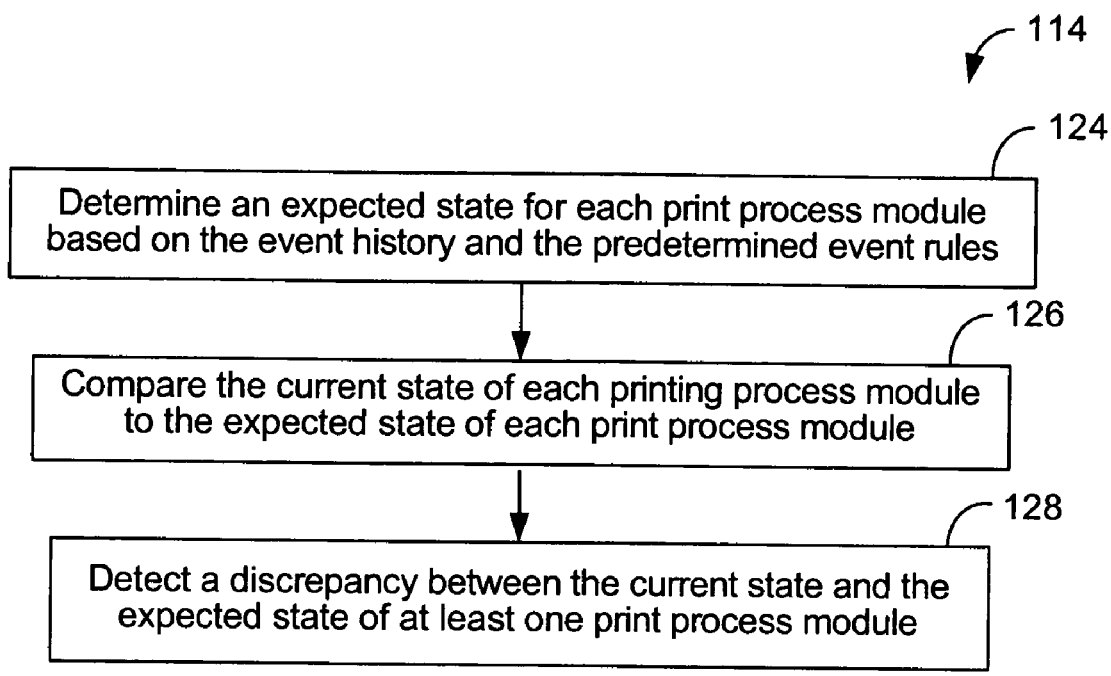
FIG. 6 is detail flowchart showing sub-steps of the step of determining that a hang condition has occurred in FIG. 5.

At 114, the method further includes determining that an exception has occurred during a printing process, based on at least one predetermined rule and the current state of at least one print process module. As shown at 116, 118, determining may include examining the global event history to determine whether the conditions of the predetermined rule are met, and verifying that the conditions of the rule remain satisfied over a predetermined period of time. Alternatively or in addition to the steps shown at 116, 118, determining whether a hang condition caused by an unexpected exception occurs may be accomplished by determining an expected state for each print process module based on the event history and the predetermined event rules, comparing the current state of each printing process module to the expected state of each print process module, and detecting a discrepancy between the current state and the expected state of one or more print process modules, as shown in FIG. 6 at 124–128.

At 120, the method further includes setting the current state of the one or more print process modules to a default condition. As shown at 122, this may be accomplished by sending a reset command from the self-correcting module to the at least one print process modules.

EXAMPLE 2

Page Notification

Figure 9:
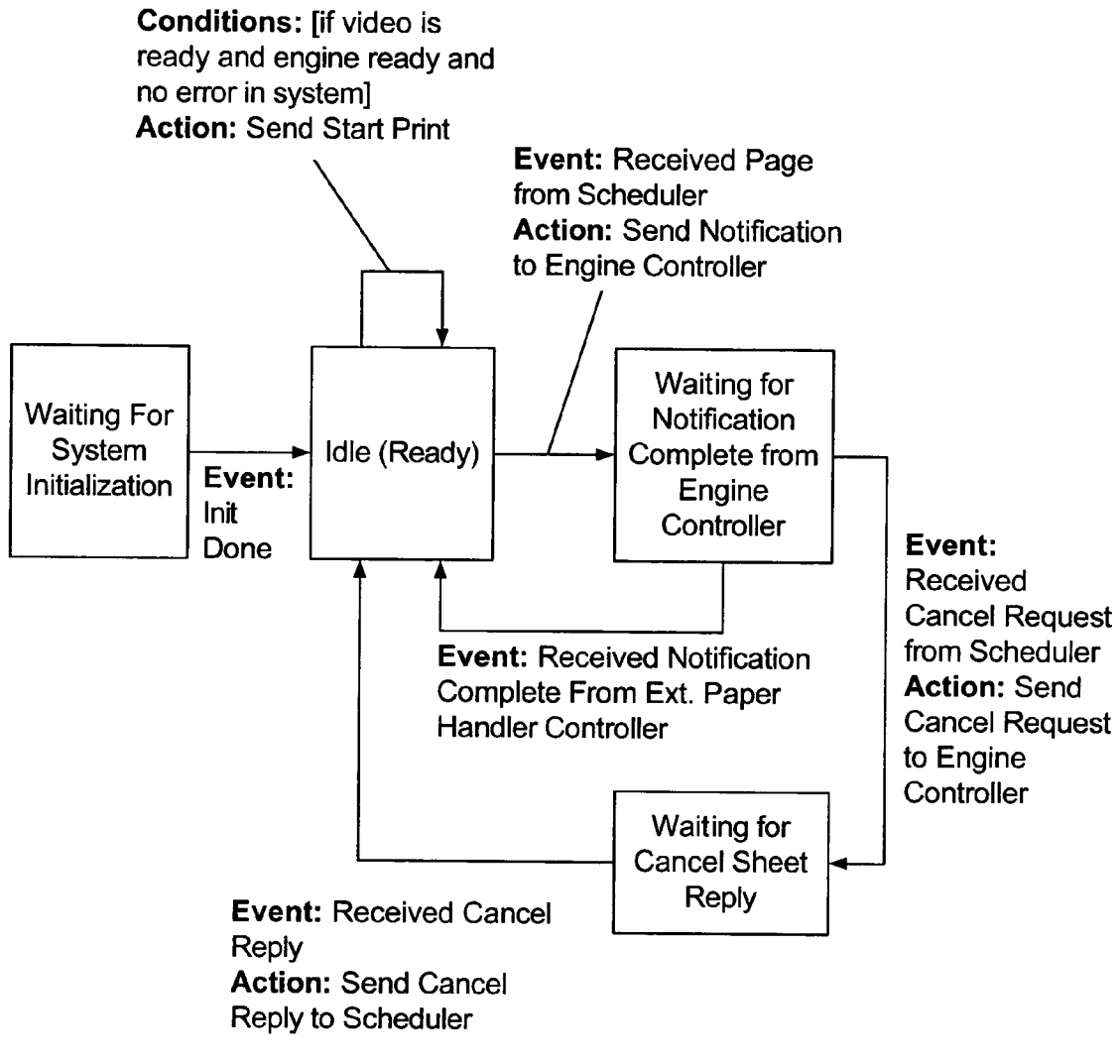
FIG. 9 is state diagram showing exemplary states of a print controller of the printing device during page notification and cancellation.

A. Proper Page Notification From Print Engine Controller or External PH Handler Controller to Print Controller During a normal print job that is properly executed by the printing device, design contract rules cause the print controller to send a page notification to the engine controller for each page of the print job, once characteristics for the page have been defined by higher level components in the printing device. For each page notification message received, the engine controller responds to the print controller with a notification complete message and a message indicating whether the page successfully printed or whether the page failed within the print engine hardware, for example, due to a paper jam. A simplified state diagram showing the states of the print controller during page notification and cancellation is shown in FIG. 9.

If the pages are going to an external PH device such as a finisher or binder, then the print controller also sends a page notification message to the external PH controller. The external PH controller responds to the print controller with a notification complete message and with a message of any delay time need by the external PH device to complete a finishing operation on the print job, such as stapling or binding the print job. The Print controller uses the delay requested by external output device to delay printing the next print job. The external PH device also sends a message indicating whether processing by the external PH device was successful or failed, e.g. due to a hardware malfunction.

Figure 7:
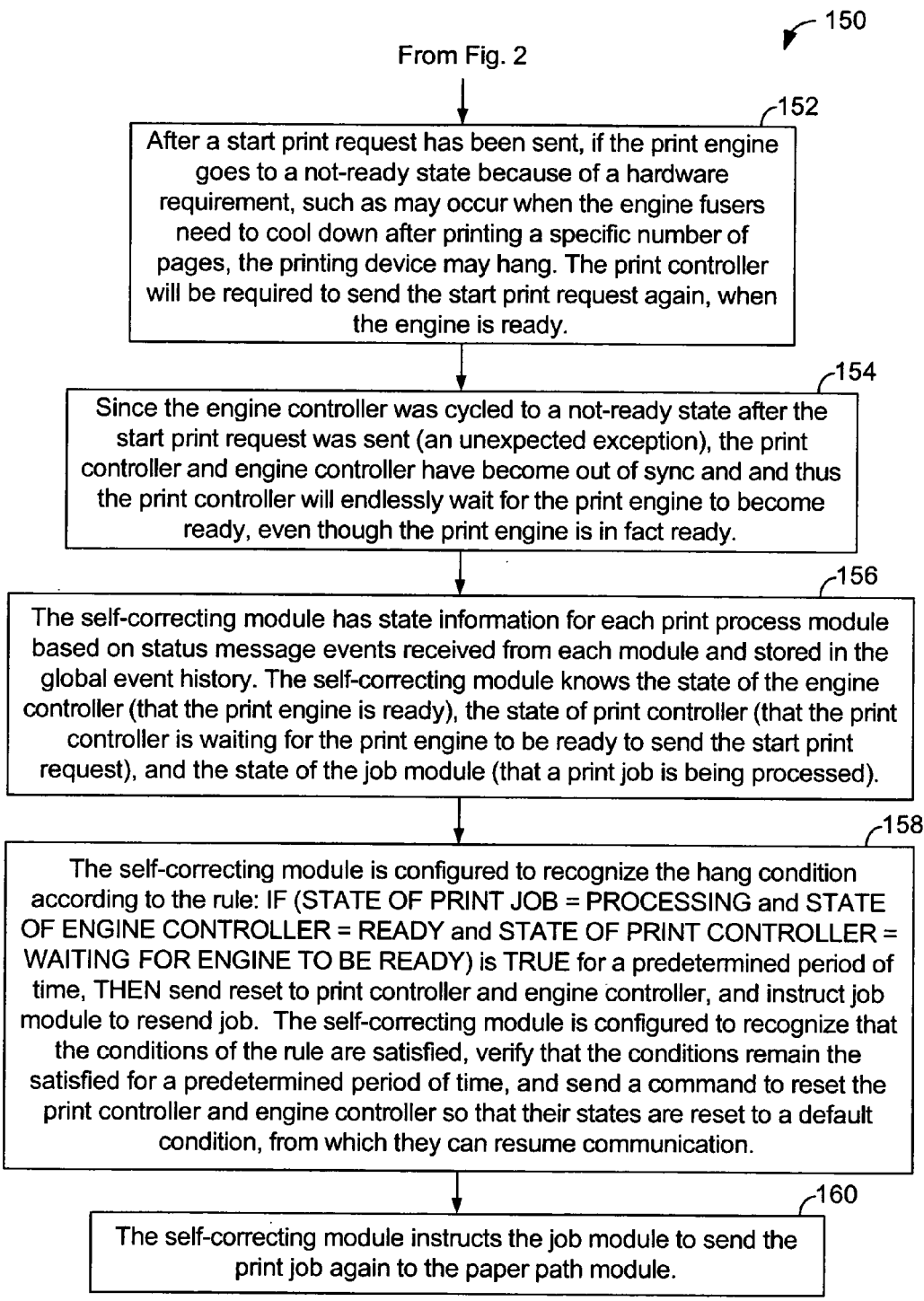
FIG. 7 is a flowchart showing a communication flow for a scenario where the printing device is hung because a print engine goes to a not ready state after a start print request has been issued.

B. Self-Correction of Hang Condition Due to Failure of Page Notification From Print Engine Controller or External PH Handler Controller FIG. 7 shows a communication flow 150 for one exemplary scenario in which the printing device experiences a hang condition because the print engine goes to a not-ready state after a start print request has been issued by the print controller. As shown at 152, a hang condition may result if, after a start print request has been sent, the print engine goes to a not-ready state because of a hardware requirement, such as may occur when the engine fusers of the print engine need to cool down after printing a specific number of pages. In order to successfully resume printing the print controller will be required to send the start print request again, when the print engine is ready.

As shown at 154, since the engine controller was cycled to a not ready state after the start print request was sent (an unexpected exception), the print controller and engine controller become out of sync and thus the print controller will endlessly wait for the print engine to become ready, even though the print engine is in fact ready. This causes the hang condition.

As shown at 156, the self-correcting module has state information for each print process module based on status messages (typically events) received from each module and stored in the global event history. Thus, the self-correcting module knows the state of the engine controller indicating that the print engine is ready, the state of the print controller indicating that the print controller is waiting for the print engine to be ready to send the start print request, and the state of the job module indicating that a job is being processed.

As shown at 158, the self-correcting module is configured to recognize that this is a hang condition according to the rule: IF (STATE OF PRINT JOB= PROCESSING and STATE OF ENGINE CONTROLLER=READY and STATE OF PRINT CONTROLLER=WAITING FOR ENGINE TO BE READY) is TRUE for a predetermined period of time, THEN send reset to print controller and engine controller, and instruct job module to resend job. The self-controller is configured to first recognize that the conditions of the rule are satisfied, verify that the conditions remain the satisfied for a predetermined period of time, and send a command to reset the print controller and engine controller so that their states are reset to a default condition, from which they can resume communication.

As shown at 160, the self-correcting module instructs the job module to send the print job again to the paper path module.

While steps 152–160 relate to a hang condition caused by miscommunication between the engine controller and the print controller, it will be appreciated that a similar hang condition may develop due to an unanticipated exception caused by miscommunication between the external paper handler and the print controller. In this case, the self-correcting module is typically configured to detect a hang condition caused by the unanticipated exception, according to an event rule as described above, reset the external PH controller and print controller to a default state, and instruct the job module to resend the print job.

EXAMPLE 3

Job Cancel

A. Successful Job Cancel Scenario

When the user initiates a job cancel, the scheduler sends a request to the print controller to cancel the pages in the current print job. The print controller sends a cancel request, one sheet (one simplex page or two duplex pages) at a time, to the engine controller, if the print controller has previously notified the engine controller of the page. The engine controller sends a request to the print engine hardware to cancel each page, if the engine controller has already reserved the page with the engine hardware. The engine controller checks the engine status before sending a cancel command to the engine, in order to verify that conditions are acceptable for the engine hardware to initiate a cancel. A simplified state diagram showing the states of the print controller during page notification and cancellation is shown in FIG. 9.

The engine controller responds to the print controller with a cancel reply, which carries a message indicating that the cancel was successfully completed, or failed. The engine controller bases its response on a response received from the print engine hardware. Typically, pages that fail to be cancelled are unable to be cancelled because they have started printing or are being delivered to the print engine hardware. The print controller responds to the scheduler with a message indicating which pages were successfully cancelled, and which pages failed cancellation. The scheduler changes the control panel display from "Canceling Job" to "Ready" when the job is cancelled and no more pages from the current job are being printed.

B. Self-Correction of Hang Condition During Job Cancel

Figure 8:
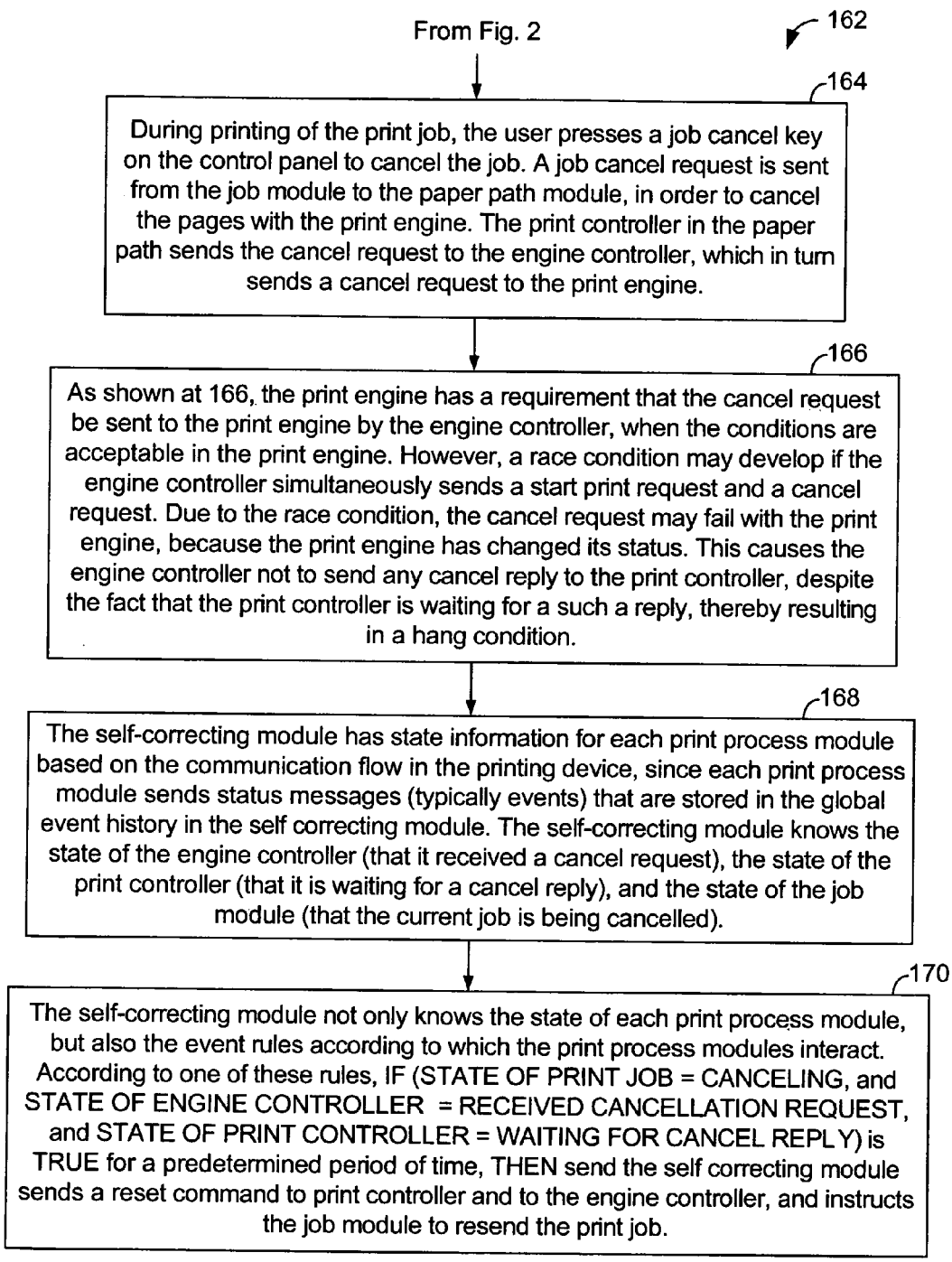
FIG. 8 is a flowchart showing a communication flow for a scenario where the printing device is hung because of a race condition in the paper path module during a job cancel request.

FIG. 8 shows a communication flow 162 for a scenario in which the printing device is hung because of a race condition during a job cancel operation. As shown at 164, during printing of a print job, the user presses a job cancel key on the control panel of the printing device in order to cancel the job. This causes a job cancel request to be sent from the job module to the paper path module, in order to cancel the pages with the print engine. The print controller in the paper path sends the cancel request to the engine controller, which in turn sends a cancel request to the print engine.

As shown at 166, the print engine has a requirement that the cancel request be sent to the print engine by the engine controller, when the conditions are acceptable in the print engine. However, a race condition may develop if the engine controller simultaneously sends a start print request and a cancel request. Due to the race condition, the cancel request may fail with the print engine, because the print engine has changed its status. This causes the engine controller not to send any cancel reply to the print controller, despite the fact that the print controller is waiting for such a reply, thereby resulting in a hang condition.

As shown at 168, the self-correcting module has state information for each module based on the communication flow in the printing device, since each print process module sends status messages (typically events) that are stored in the global event history in the self-correcting module. The self-correcting module knows the state of the engine controller (that it received a cancel request), the state of the print controller (that it is waiting for a cancel reply), and the state of the job module (that the current job is being cancelled).

As shown at 170, the self-correcting module not only knows the state of each print process module, but also the event rules according to which the print process modules interact. According to one of these rules, IF (STATE OF PRINT JOB=CANCELING, and STATE OF ENGINE CONTROLLER=RECEIVED CANCELLATION REQUEST, and STATE OF PRINT CONTROLLER=WAITING FOR CANCEL REPLY) is TRUE for a predetermined period of time, THEN the self-correcting module sends a reset command to print controller and to the engine controller, and instructs the job module to resend the print job. A timer is typically used to time the predetermined period of time.

According to another embodiment of the invention, a computer program product is provided. The computer program product typically includes a computer usable medium having computer readable program code embodied therein for causing correction of an unexpected exception condition within firmware of a printing device. The computer readable program code in the computer program product typically includes computer readable program code configured to cause a printing device to determine a current state of at least one module of the firmware, computer readable program code configured to cause the printing device to compare the current state to an expected state, computer readable program code configured to cause the printing device to detect a discrepancy between the current state and the expected state, and computer readable program code configured to cause the printing device to set the current state to a default condition. The computer program product may further include computer readable program code configured to cause a printing device to determine the expected state from an event history. The expected state may be determined from the event history using a set of event rules.

The embodiments of the present invention have industrial applicability to the printing device industry, and enable self-correction of unanticipated exceptions during printing.

While the present invention has been particularly shown and described, those skilled in the art will understand that many variations may be made therein without departing from the spirit and scope defined in the following claims. The description should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

What is claimed is:

1. A method of correcting an exception during a printing process at least partially controlled by a plurality of print process modules associated with a printing device, the plurality of print process modules including a paper path module with a print controller and an engine controller, the method comprising:

monitoring, from a self-correcting module, a state of each of a plurality of the print process modules, wherein the print process modules interact according to a set of rules to control the printing process;

determining that the printing device is hung based on at least one predetermined rule and the state of at least one print process module; and setting a current state of the at least one print process module to a default condition;

wherein the predetermined rule is:

if, for a predetermined period of time, a state of a current print job is processing, and a current state of the engine controller is ready, and a current state of the print controller is waiting for an associated print engine to be ready, then send a reset command to the print controller and send a reset command to the engine controller, to cause each of the print controller and the engine controller to return to a default state.

2. The method of claim 1, wherein monitoring includes receiving a status message from each of the printing process modules into a global event history queue of the self-correcting module.

3. The method of claim 2, wherein determining includes examining the global event history queue to determine whether conditions of the predetermined rule are met.

4. The method of claim 1, further comprising automatically resending at least a portion of the print job to the at least one print process module.

5. The method of claim 1, wherein each of the print process modules is stored as firmware within the printing device.

6. A method of correcting an exception during a printing process at least partially controlled by a plurality of print process modules associated with a printing device, the plurality of print process modules including a paper path module with a print controller and an engine controller, the method comprising:

monitoring, from a self-correcting module, a state of each of a plurality of the print process modules, wherein the print process modules interact according to a set of rules to control the printing process;

determining that the printing device is hung based on at least one predetermined rule and the state of at least one print process module; and setting a current state of the at least one print process module to a default condition;

wherein the predetermined rule is:

if, for a predetermined period of time, a current state of a current print job is pending cancellation, and a current state of the engine controller is received cancel request, and a current state of the print controller is waiting for cancel reply, then sending a reset command to the print controller and sending a reset command to the engine controller, to cause each of the print controller and the engine controller to return to a default state.

7. The method of claim 6, wherein monitoring includes receiving a status message from each of the printing process modules into a global event history queue of the self-correcting module.

8. The method of claim 7, wherein determining includes examining the global event history queue to determine whether conditions of the predetermined rule are met.

9. The method of claim 6, further comprising automatically resending at least a portion of the print job to the at least one print process module.

10. The method of claim 6, wherein each of the print process modules is stored as firmware within the printing device.

* * * * *